W. H. TAYLOR.
ROTARY WELL DRILLING MACHINE.
APPLICATION FILED MAR. 12, 1920.

1,386,908.

Patented Aug. 9, 1921.

Inventor
W. H. Taylor.
By Max A. Schmidt
Attorney

UNITED STATES PATENT OFFICE.

WILLIAM HENRY TAYLOR, OF HULL, TEXAS.

ROTARY WELL-DRILLING MACHINE.

1,386,908.   Specification of Letters Patent.   Patented Aug. 9, 1921.

Application filed March 12, 1920. Serial No. 365,204.

*To all whom it may concern:*

Be it known that I, WILLIAM H. TAYLOR, a citizen of the United States, residing at Hull, in the county of Liberty and State of Texas, have invented certain new and useful Improvements in Rotary Well-Drilling Machines, of which the following is a specification.

This invention relates to well drilling rigs commonly known as "rotaries," in which a turntable is used for rotating the tool and pipe.

The invention has special reference to the turntable, and its object is to provide the same with an independently rotatable section which may be used for screwing up and unscrewing pipe sections while the turntable proper remains stationary.

The invention also has for its object to provide a simple means for driving the aforesaid table section from the driving means of the main table.

The objects stated are attained by means of a novel combination and arrangement of parts to be hereinafter described and claimed and in order that the same may be better understood, reference is had to the accompanying drawing forming a part of this specification.

Figure 1:
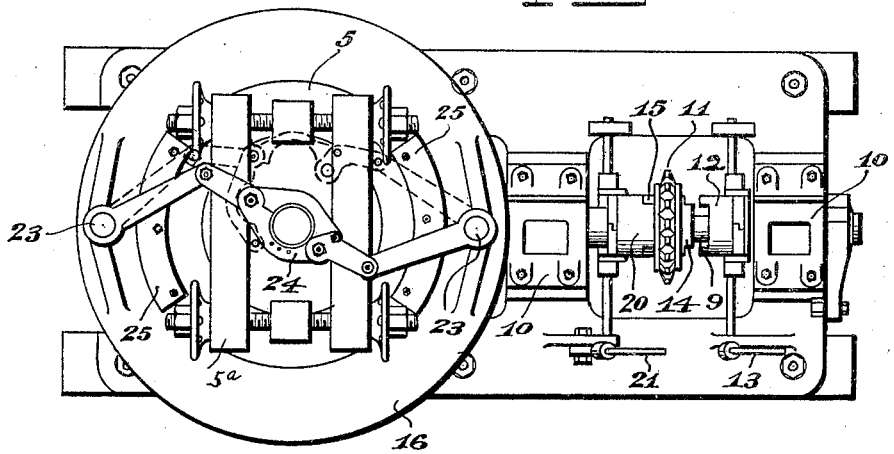
Figure 2:
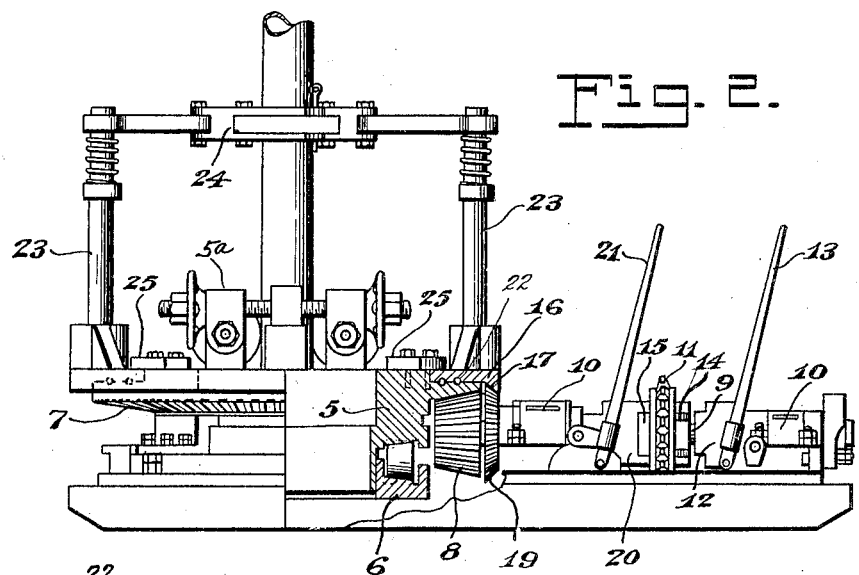
Figure 3:
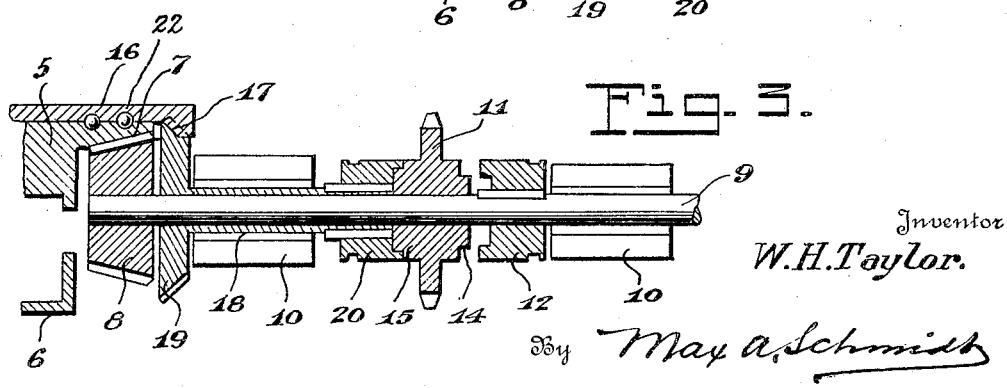

In the drawing, Figure 1 is a plan view of the invention; Fig. 2 is an elevation thereof, partly in section, and Fig. 3 is a sectional detail of a driving means and control therefor.

Referring specifically to the drawing, 5 denotes the rotary top or turntable of a rotary well drilling machine, the same being supported on a base 6 and having an annular rack 7 on its under side with which latter meshes a drive pinion 8. The table carries the usual devices 5ª for clamping the drill pipe or stem, and as these devices form no part of the present invention, they need not be described.

The drive pinion 8 is on a shaft 9 supported in suitable bearings 10. A sprocket wheel 11 running loose on the shaft 9 obtains motion from a suitable power source, and the motion of said sprocket wheel is transmitted to the shaft by a clutch member 12 which is slidable on the shaft and is shifted thereon by a lever 13. The clutch member 12 has jaws on one side adapted to interlock with similar jaws 14 on one side of the sprocket wheel 11, and as the clutch member is connected to the shaft 9 to turn the same, it will be evident that when the clutch jaws interlock, the motion of the sprocket wheel is transmitted to the shaft. On the opposite side of the sprocket wheel 11 are clutch jaws 15 for a purpose to be presently described.

The top of the main table 5, near its periphery, has a recess in which rotatably seats a ring 16, forming a secondary table, and having a portion projecting downwardly from the main table and provided with an annular rack 17. On the shaft 9 is mounted a sleeve 18 carrying a bevel pinion 19 at one end which is in mesh with the rack 17. On the other end of the sleeve is a clutch member 20 having its jaws opposite the clutch jaws 15 of the sprocket wheel 11. The sleeve 18 is free to turn on the shaft 9, and hence it will be seen that when the clutch member 20 is interlocked with the sprocket wheel 11, the motion of the latter is transmitted to the pinion 19, and the ring or secondary table 16 is rotated. The clutch member 20 is slidable on the sleeve 18 and so connected thereto that it rotates the sleeve. A hand lever 21 is provided for shifting the clutch member 20.

Secondary table 16 has a ball-bearing 22 on the main table 5, and carries posts 23 to which are anchored the tongs 24 which are to grip the pipe or casing to be turned for screwing up or unscrewing the same.

The main table 5 carries retaining plates 25 for the secondary table 16, said plates overlapping the latter and thus preventing upward displacement thereof.

When the main table 5 is to be used, the clutch member 20 will be shifted free of the sprocket wheel 11, and the clutch member 12 shifted to interlock with said sprocket wheel. The motion of the sprocket wheel 11 is now transmitted to the shaft 9 and the bevel pinion 8 thereon, and as said pinion is in mesh with the rack 7 of the table, the latter is set in motion. When the secondary table 16 is to be used, the clutch member 12 will be disengaged from the sprocket wheel 11, and the clutch member 20 engaged therewith. The main table 5 now remains stationary, and the secondary table 16 is rotated by the pinion 19 in mesh with its rack 17. The main table will be used for the ordinary drilling operations, and for unscrewing casing sections or pipes, whereas the secondary table will be used for screwing up casing sections or pipes.

When unscrewing casing sections or pipes, the main turntable 5 is driven to rotate the work to effect the disconnection, the section above being held stationary by the tongs 24 of the secondary table 16, the latter being held stationary. For screwing up the sections, the operation is the reverse, the secondary table being driven to rotate the work to effect the connection, and the section below being held stationary by the clamping devices 5ᵃ of the main table 5, which latter is now held stationary. It will therefore be seen that the operation of connecting and disconnecting pipe or casing sections is effected without reversing the motion of the rotary, the main table when unscrewing a section turning in the same direction the secondary table turns when the latter is screwing up a section.

The apparatus is very simple and efficient, and it is easily controlled as a single sprocket wheel drives both tables.

The preferred embodiment of the invention has been disclosed, but it will be understood that various changes and modifications may be made without a departure from the spirit and scope of the invention as claimed hereinafter.

I claim—

1. In a rotary well drilling machine, a main turntable, work-gripping means thereon, a secondary table rotatably mounted on said main table, work-gripping means on the secondary table and means for independently driving both of said tables.

2. In a rotary well drilling machine, a main turntable, work-gripping means thereon, a secondary table rotatably mounted on said main table, work-gripping means on the secondary table, annular racks on the tables, and drive pinions in mesh with the respective racks.

3. In a rotary well drilling machine, a main turntable, work-gripping means thereon, a secondary table rotatably mounted on said main table, work-gripping means on the secondary table, annular racks on the tables, drive pinions in mesh with the respective racks, a shaft carrying one of the pinions, a sleeve loose on said shaft and carrying the other pinion, independently operable clutch members slidable on the shaft and the sleeve, and having driving connections therewith, and a driven clutch member loose on the shaft and engageable by the aforesaid clutch members.

4. In a rotary well drilling machine, a main turntable and a secondary turntable concentrically arranged with respect to each other, work gripping means on both turntables, and means for independently driving the turntables.

In testimony whereof, I affix my signature.

WILLIAM HENRY TAYLOR.